United States Patent
Mentovich et al.

(10) Patent No.: US 10,502,908 B2
(45) Date of Patent: Dec. 10, 2019

(54) LONG-REACH ACTIVE OPTICAL CABLE

(71) Applicant: Mellanox Technologies, Ltd., Yokneam (IL)

(72) Inventors: Elad Mentovich, Tel Aviv (IL); Sylvie Rockman, Zichron Yaakov (IL); Itshak Kalifa, Ramat Gan (IL); Yaakov Gridish, Yoqneam Ilit (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 15/457,265

(22) Filed: Mar. 13, 2017

(65) Prior Publication Data
US 2018/0259723 A1    Sep. 13, 2018

(51) Int. Cl.
*G02B 6/42* (2006.01)
*H04B 10/40* (2013.01)
*G02B 6/14* (2006.01)
*G02B 6/32* (2006.01)

(52) U.S. Cl.
CPC .............. *G02B 6/4206* (2013.01); *G02B 6/14* (2013.01); *G02B 6/32* (2013.01); *G02B 6/4214* (2013.01); *G02B 6/4292* (2013.01); *H04B 10/40* (2013.01)

(58) Field of Classification Search
CPC ...... G02B 6/4206; G02B 6/32; G02B 6/4214; G02B 6/14; G02B 6/4292; H04B 10/40
See application file for complete search history.

(56) References Cited

U.S. PATENT DOCUMENTS

| | | | | |
|---|---|---|---|---|
| 5,271,076 A | * | 12/1993 | Ames | G02B 6/32 359/900 |
| 5,533,152 A | * | 7/1996 | Kessler | B23K 26/0604 359/489.07 |
| 6,668,112 B1 | * | 12/2003 | Kaneda | G02B 6/4214 359/341.32 |
| 7,228,032 B2 | * | 6/2007 | Blauvelt | G02B 6/264 385/31 |

(Continued)

OTHER PUBLICATIONS

C. Debaes, et all, "Low-cost micro-optical modules for MCM level optical Interconnections", IEEE J. of Sel. Topics in Quantum Electronics, vol. 9, No. 2, pp. 518-530, 2003.*

(Continued)

*Primary Examiner* — Peter Radkowski
(74) *Attorney, Agent, or Firm* — Alston & Bird LLP (57) ABSTRACT

A optical assembly and a method of reducing interference using the same may be provided. The optical assembly may include an optical cable and an optical transceiver module. The optical transceiver module may include a socket configured to receive the optical cable, an electro-optical transducer configured to generate an optical signal, and an optical lantern. The optical lantern may include an optical prism that may receive the optical signal via a first surface, disperse the optical signal into a plurality of modes of the optical signal, and output the plurality of modes via a second surface. A mirror may reflect the optical signal from a first direction extending between the first surface and the mirror to a second direction extending between the mirror and the second surface. The optical lantern may direct at least one of the plurality of modes of the optical signal into the optical cable.

20 Claims, 6 Drawing Sheets

(56) References Cited

U.S. PATENT DOCUMENTS

| | | | | |
|---|---|---|---|---|
| 8,384,045 | B2* | 2/2013 | Takasaki | G01N 15/1434 250/459.1 |
| 9,411,100 | B2* | 8/2016 | Fontaine | G02B 6/14 |
| 9,537,282 | B2* | 1/2017 | Fontaine | H01S 3/094065 |
| 2005/0152643 | A1* | 7/2005 | Blauvelt | G02B 6/264 385/31 |
| 2011/0037183 | A1* | 2/2011 | Tudury | G02B 6/0288 264/1.28 |
| 2012/0001090 | A1* | 1/2012 | Takasaki | G01N 15/1434 250/459.1 |
| 2013/0202255 | A1* | 8/2013 | Togami | G02B 6/421 385/79 |
| 2014/0153881 | A1* | 6/2014 | Liff | G02B 6/4214 385/89 |
| 2015/0050019 | A1* | 2/2015 | Sengupta | H04J 14/04 398/44 |
| 2015/0085351 | A1* | 3/2015 | Fontaine | H01S 3/094065 359/341.3 |
| 2015/0086157 | A1* | 3/2015 | Fontaine | G02B 6/14 385/28 |
| 2015/0098697 | A1* | 4/2015 | Marom | H04J 14/04 398/44 |
| 2017/0031115 | A1* | 2/2017 | Schaevitz | G02B 6/4228 |

OTHER PUBLICATIONS

Bardinal et al., Collective Micro-Optics Technologies for VCSEL Photonic Integration. Advances in Optical Technologies. 2011.*

Chang et al., High-speed Light Peak optical link for high energy applications, In Nuclear Instruments and Methods in Physics Research Section A: Accelerators, Spectrometers, Detectors and Associated Equipment, vol. 765, 2014, pp. 69-73.*

Debaes et al, Micro-optical Modules for Board and Chip Level interconnects, 2006, available at https://escies.org/download/webDocumentFile?id=1647.*

Debaes, et all, "Low-cost micro-optical modules for MCM level optical Interconnections", IEEE J. of Sel. Topics in Quantum Electronics, vol. 9, No. 2, pp. 518-530, 2003.*

Tsai et al., "Analysis of optical channel cross talk for free-space optical interconnects in the presence of higher-order transverse modes," Appl. Opt. 44, 6380-6387 (2005).*

Leon-Saval et al., "Mode-selective photonic lanterns for space-division multiplexing," Opt. Express 22, 1036-1044 (2014) (Year: 2014).*

Trabold et al., "Selective excitation of higher order modes in hollow-core PCF via prism-coupling," Opt. Lett. 39, 3736-3739 (2014) (Year: 2014).*

"3D Mmux Photonic Lantern—Optoscribe." [Retrieved May 11, 2017] Retrieved from the Internet: <URL: http://www.optoscribe.com/products/3d-mmux-photonic-lantern/>. (dated 2017) 2 pages.

"Multi-Mode Micro Lens Array (MLA) P1L: Individual Datasheet." [Retrieved May 11, 2017]. Retrieved from the Internet: <URL: https://echannel.omron247.com/marcom/pdfcatal.nsf/26d51fcb808d916986256f7e00791221/82709a36047e62c48625714c0059625d/$FILE/Individual%20Datasheet%20MLA%20PIL.pdf>. (undated) 2 pages.

"Optoscribe 3D-Mmux Photonic Lantern." [Retrieved May 11, 2017]. Retrieved from the Internet: <URL: http://www.optoscribe.com/lasertech/uploads/2016/08/OPTOSCRIBE-3D-MMux-Photonic-Lantern-OFS-ports.pdf>. (dated 2014) 2 pages.

"Products| enplas corporation." [retrieved May 11, 2017]. Retrieved via the Internet Archive Wayback Machine at <URL: https://web.archive.org/web/20161018093734/http://www.enplas.co.jp/english/business/business/opto_product/>. (dated 2012). 2 pages.

"SUSS MicroOptics SA Catalog 2007: Microlens Arrays." [Retrieved May 11, 2017] Retrieved from the Internet: <URL: http://www.amstechnologies.com/fileadmin/amsmedia/downloads/2067_SMO_catalog.pdf> (dated May 2006), 22 pages.

"SUSS MicroOptics: Maximum Coupling Efficiency for Telecom/Datacom." [Retrieved May 11, 2017] Retrieved from the Internet: <URL: http://www.suss-microoptics.com/media/downloads/SUSS-MicroOptics_Coupling-Efficiency.pdf> (dated Jan. 2014), 1 page.

Leon-Saval et al. "Mode-Selective Photonic Lanterns for Space-Division Multiplexing." Optics Express, vol. 22, No. 1, Jan. 13, 2014, 9 pages.

Leon-Saval et al. "Photonic Lantern." [Retrieved May 11, 2017]. Retrieved from the Internet: <URL: https://arxiv.org/ftp/arxiv/papers/1503/1503.03269.pdf>. (dated Dec. 2013) 14 pages.

* cited by examiner

LONG-REACH ACTIVE OPTICAL CABLE

BACKGROUND

Optical fibers are thin filaments cladded in a material with a low index of refraction capable of transmitting optical signals. Various types of optical fibers are present in the art including single mode optical fiber (SMF) and multi-mode optical fiber (MMF). Traditionally, SMFs are comprised of thin glass fibers and are often utilized in longer distance and high speed applications. MMFs are configured similarly to SMFs, but are designed to carry multiple modes of optical signals at the same time, each signal being transmitted at a slightly different reflection angle. Unlike SMFs, which can carry optical signals over long distances, MMFs are typically used for shorter transmission distances. For covering large distances, MMFs are typically inoperable due to excessive noise and interference of the fiber modes. SMFs have reduced interference but are often cost prohibitive to manufacture and install.

Optical fibers may thus serve as the transmission media for optical signals generated by optoelectronic transceivers. For example, optical fibers are often used in conjunction with various types of light-emitting components, which generate the optical signal based on an electrical input for transmission through the fibers. Often, for example, vertical-cavity surface-emitting lasers (VCSELs) are used to emit light through the fiber optic cables. Other sources of light include edge emitting lasers, edge emitting silicon phontoics components, collimated VCSELs, lens integrated surface emitting lasers (LISELs), and other sources.

Applicant has identified a number of deficiencies and problems associated with conventional optical fiber transceivers, couplers, interfaces, and other associated systems. Through applied effort, ingenuity, and innovation, many of these identified problems have been solved by developing solutions that are included in embodiments of the present invention, many examples of which are described in detail herein.

BRIEF SUMMARY

Optical assemblies, active optical cables, and corresponding methods of use and manufacture are therefore herein described that are configured to improve performance and cost effectiveness of the optical assemblies.

In some embodiments, an optical assembly may be provided that includes an optical cable an optical transceiver module. The optical transceiver module may include a socket configured to receive the optical cable, an electro-optical transducer configured to generate an optical signal, and an optical lantern. The optical lantern may include an optical prism defining a first surface and a second surface. The optical prism may be configured to receive the optical signal via the first surface, disperse the optical signal into a plurality of modes of the optical signal, and output the plurality of modes via the second surface. The optical lantern may further include a mirror configured to reflect the optical signal from a first direction extending between the first surface and the mirror to a second direction extending between the mirror and the second surface. The optical lantern may be configured to direct at least one of the plurality of modes of the optical signal into the optical cable.

In some embodiments, the optical assembly may include a first lens defined on the first surface of the optical lantern. The first lens may be configured to refract the optical signal between the electro-optical transducer and the first surface. The optical assembly may include a second lens defined on the second surface of the optical lantern, wherein the second lens is configured to refract the at least one of the plurality of modes of the optical signal between the second surface and the optical cable.

In some embodiments, the first direction may be substantially perpendicular to the second direction.

The mirror may be defined on a third surface of the optical lantern. In some embodiments, each of the first surface, the second surface, and the third surface is in optical communication with each of the other of the first surface, the second surface, and the third surface within the optical lantern. The first direction may be substantially perpendicular to the second direction, and the third surface may be oriented at approximately 45 degrees with respect to both the first surface and the second surface.

In some embodiments, the optical cable may be configured to align with fewer than all of the plurality of modes of the optical signal. In some embodiments, the optical cable may be configured to align with three, four, or five modes of the optical signal. In some embodiments, the optical cable may be configured to align with one mode of the optical signal.

The optical lantern may be configured to output each of the plurality of modes at a different position on the second surface. In some embodiments, the optical lantern may be configured to separate each of the plurality of modes by at least 5 µm. The optical cable may be configured to be positioned adjacent the different position of the at least one of the plurality of modes.

In some embodiments, the optical cable may be a multi-mode optical fiber cable. In some embodiments, the electro-optical transducer is a vertical-cavity surface-emitting laser (VCSEL).

In another embodiment, a method of reducing interference in an active optical cable may be provided. The active optical cable may include an optical cable and an optical transceiver module that may include a socket configured to receive the optical cable; an electro-optical transducer; and an optical lantern. The optical lantern may include an optical prism defining a first surface and a second surface, and a mirror configured to reflect the optical signal from a first direction extending between the first surface and the mirror to a second direction extending between the mirror and the second surface. The method may include generating an optical signal directed towards the first surface using the electro-optical transducer, such that the optical prism receives the optical signal incident the first surface; dispersing the optical signal within the optical prism into a plurality of modes of the optical signal; and directing at least one of the plurality of modes of the optical signal into the optical cable.

In some embodiments, directing at least one of the plurality of modes of the optical signal into the optical cable may include directing fewer than all of the plurality of modes of the optical signal into the optical cable.

The active optical cable may further include a first lens defined on the first surface of the optical lantern, and the generated optical signal may be refracted by the first lens. In some embodiments, the active optical cable may include a second lens defined on the second surface of the optical lantern, and the at least one of the plurality of modes of the optical signal may be refracted by the second lens.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION

Optical cables are comprised of optical fibers. Optical cables may be utilized in conjunction with optical transmitters and receivers built into transceiver modules and systems located at the ends of the optical cables for transmitting and receiving the optical communication signals carried by the fibers to form an Active Optical Cable (AOC). The transceiver modules may include small form-factor pluggable (SFP) transceivers or dual SFP transceivers. The transceiver modules or systems may plug into suitable electrical communication ports, such as Gigabit Ethernet or InfiniBand® ports, of switching and computing equipment. Optoelectronic and opto-mechanical components in the transceiver modules and systems may convert the high-speed electrical signals output by the ports into optical signals for transmission over the fibers. In addition, these components may convert the optical signals received over the fibers into high-speed electrical signals for input to the ports.

In many transceiver modules and systems, laser diodes, such as VCSELs, are used to generate optical signals for transmission over optical fibers. VCSELs in particular are favored for their high bandwidth and efficiency. In some implementations, an array of such VCSELs is used to drive a corresponding array of optical fibers, which are joined together in a ribbon configuration. Optical fibers may be connected to both VCSELs and photodiode configurations on opposing ends such that one or more photodiodes may receive the light from the VCSELs and convert the incident light into electrical signals. One or more sources may provide the electrical signals for transmission from a transmitting device or receiving the electrical signals after receipt from the transmitting device, and each source may be associated with one or more VCSELs and/or photodiodes. The sources may provide electrical signals to the VCSELs, for transmission via optical fibers or may receive electrical signals received by the photodiodes via optical fibers.

AOCs may be used in data centers and other large networking environments to enable fast, cost-effective communication between servers. Because of the relatively large quantity of AOCs needed for each server, cost is often the driving factor for data-center hardware. While MMFs provide a relatively cost-effective connection means, the inventors have discovered that MMF performance drops off for the larger communication distances required by new mega data centers. In particular, the inventors have discovered that the most noticeable weakness of current MMF technology occurs at cable lengths of 200 m and greater. The inventors have discovered that this degraded performance is often caused by interference and noise in the optical signal when the many modes of the optical signal randomly and unpredictably reflect and refract within the fiber until the signal becomes indecipherable over large distances. While SMF offer better long-range performance, they are often prohibitively expensive and time consuming to operate in large data centers.

Some embodiments of the optical transceiver modules described herein include an optical lantern that spatially filters the MMF optical signal to reduce long-range interference. While some interference reduction techniques may include flat optical filters that block certain wavelengths of light, these filters force the AOC to operate in only the specific wavelengths of light that pass through the filter, and the wavelengths admitted by the filters often change with temperature, making them inapplicable for situations where temperatures may fluctuate.

Figure 1:
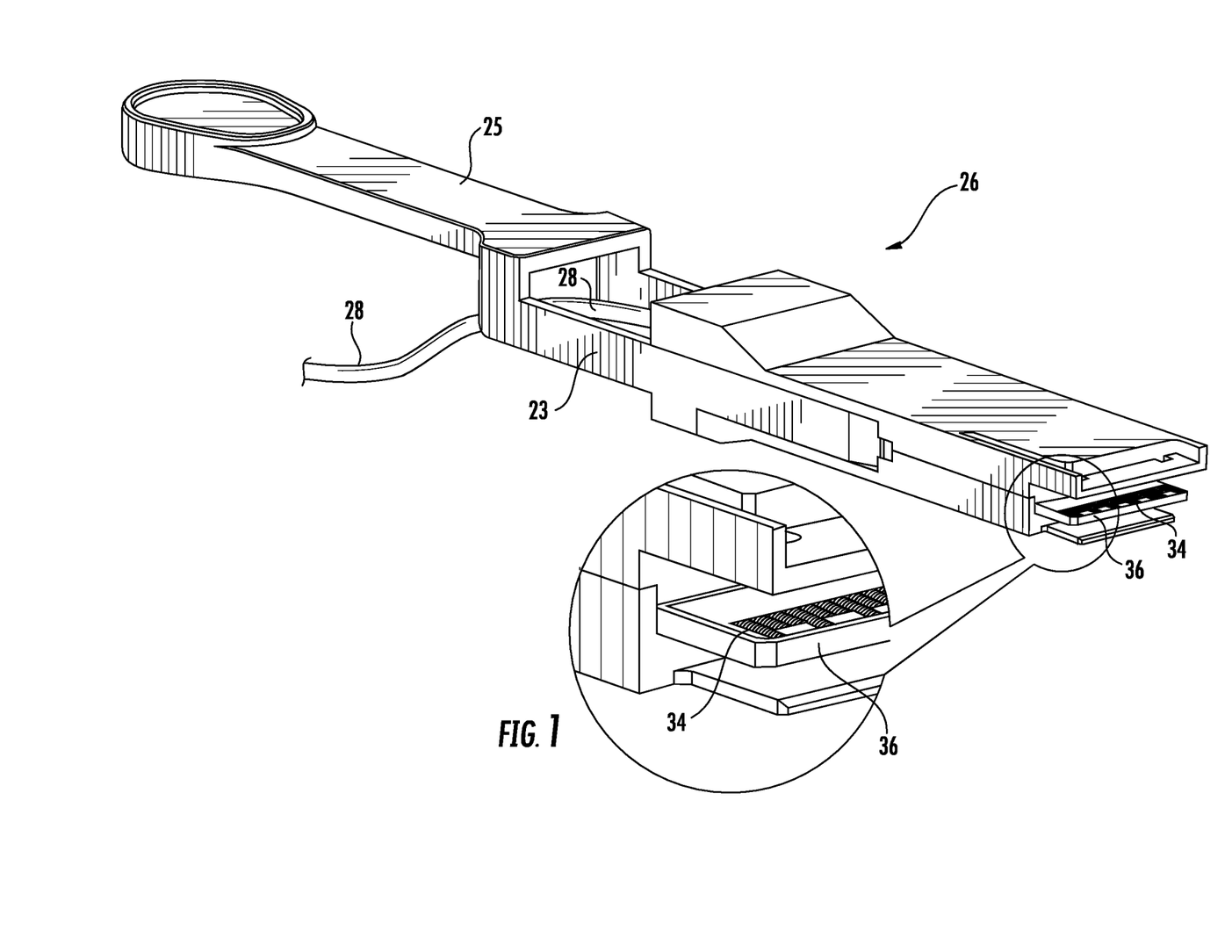
FIG. 1 shows a transceiver module according to some embodiments discussed herein.

With reference to FIG. 1, a schematic pictorial illustration of a transceiver module 26 is shown having an optical cable 28 connected thereto. A housing 23 comprises a handle 25 and a printed circuit board (PCB) 36 connected to one or more cables 28. The handle 25 may insert/eject the PCB 36 to/from an interface with a server. The PCB 36 conducts electrical communication signals, via copper inputs 34, into module 26 and supports components such as the VCSELs, photodiodes (PDs), and other transducers; the controller, etc. for converting the electrical signals to optical communication signals and/or vice versa. Fibers of the cable 28 carry the optical communication signals between transceiver modules.

Transceiver module 26 comprises a housing 23 including a top cover, and comprises the electrical and optical components of module. Copper inputs 34 conduct an electrical communication signal via PCB 36 into an optical interface module, which converts the electrical communication signal into an optical communication signal. The transceiver module 26 may comprise multiple transducers, such as vertical-cavity surface emitting lasers (VCSELs), and may include a controller, which may be a microprocessor. The VCSELs receive electrical inputs from PCB 36 and convert them to optical signals. Fibers of the cables 28 carry the optical communication signals.

Figure 2:
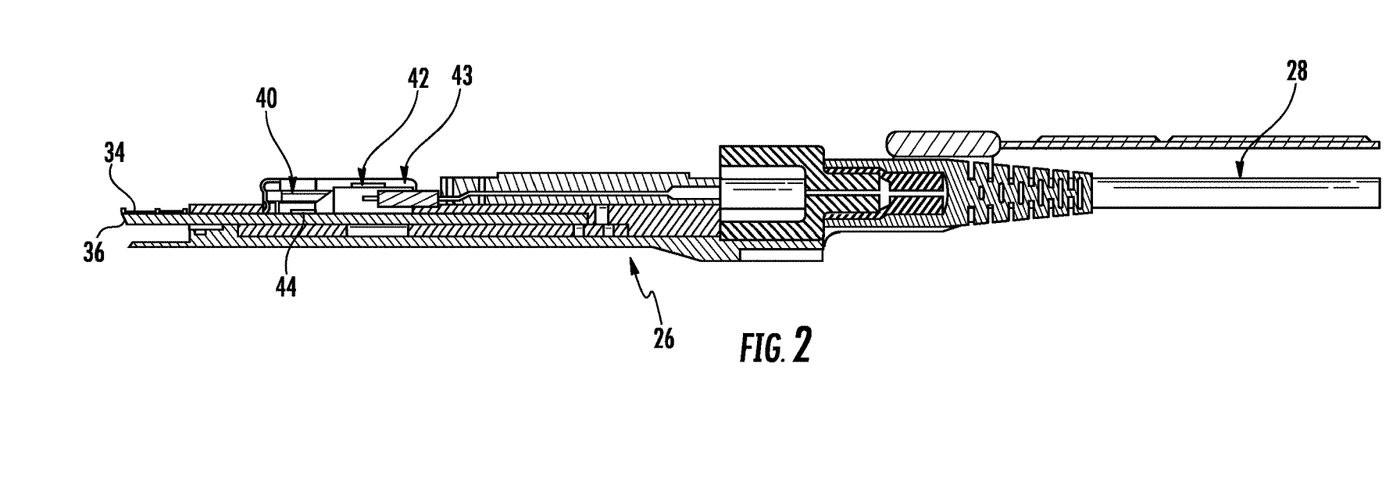
FIG. 2 shows a cross-sectional view of the transceiver module of FIG. 1.

In the embodiment of FIG. 2, a cross-sectional view of the transceiver module 26 of FIG. 1 is shown. The transceiver module 26 may engage one or more optical cables 28 and may transmit and receive optical signals over the cables. In some embodiments, the optical cable 28 may include Multi-Fiber Push On/Off (MPO) connectors 42 inserted into a socket 43 in the transceiver 26 to optically connect the cable with the transceiver. An electro-optical transducer 44 may transmit and/or receive the optical signal. To connect the transducer 44 with the connector 42 of the cable 28, an optical lantern assembly 40 according to any of the embodiments described herein may be used.

Figure 3:
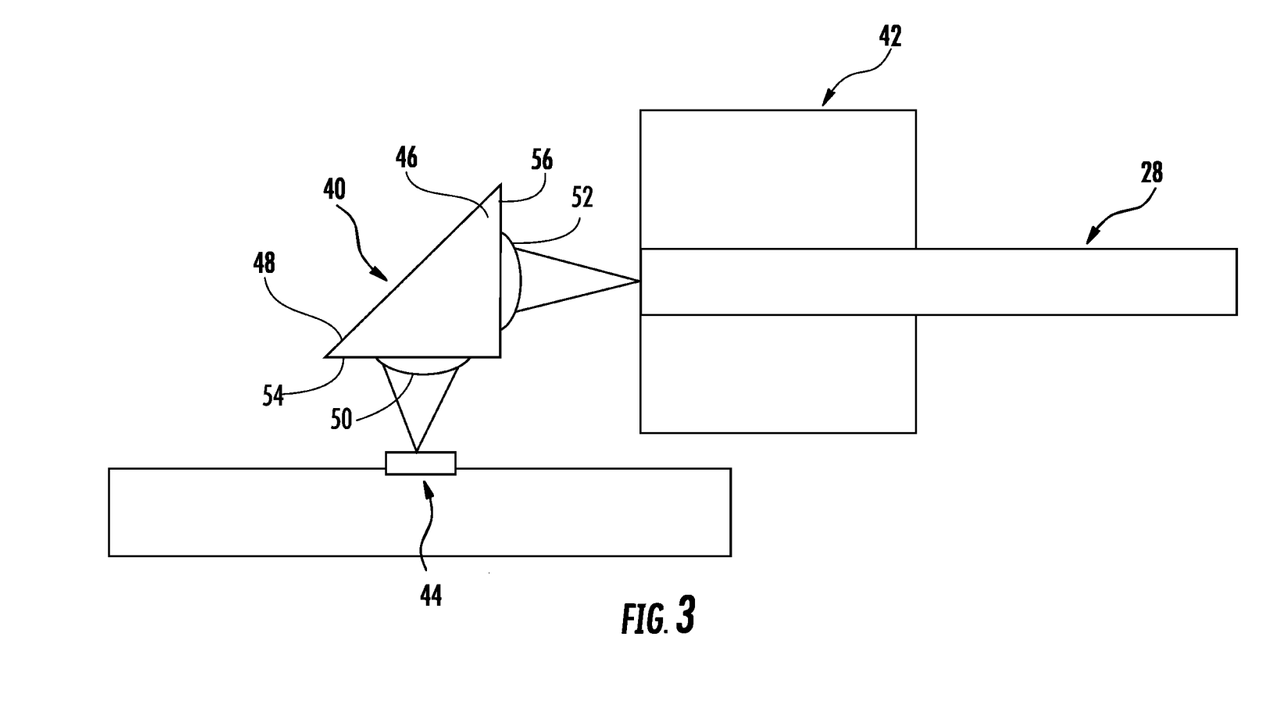
FIG. 3 shows a simplified schematic illustration of an embodiment of an optical lantern assembly aligned with an optical cable according to some embodiments discussed herein.
Figure 4:
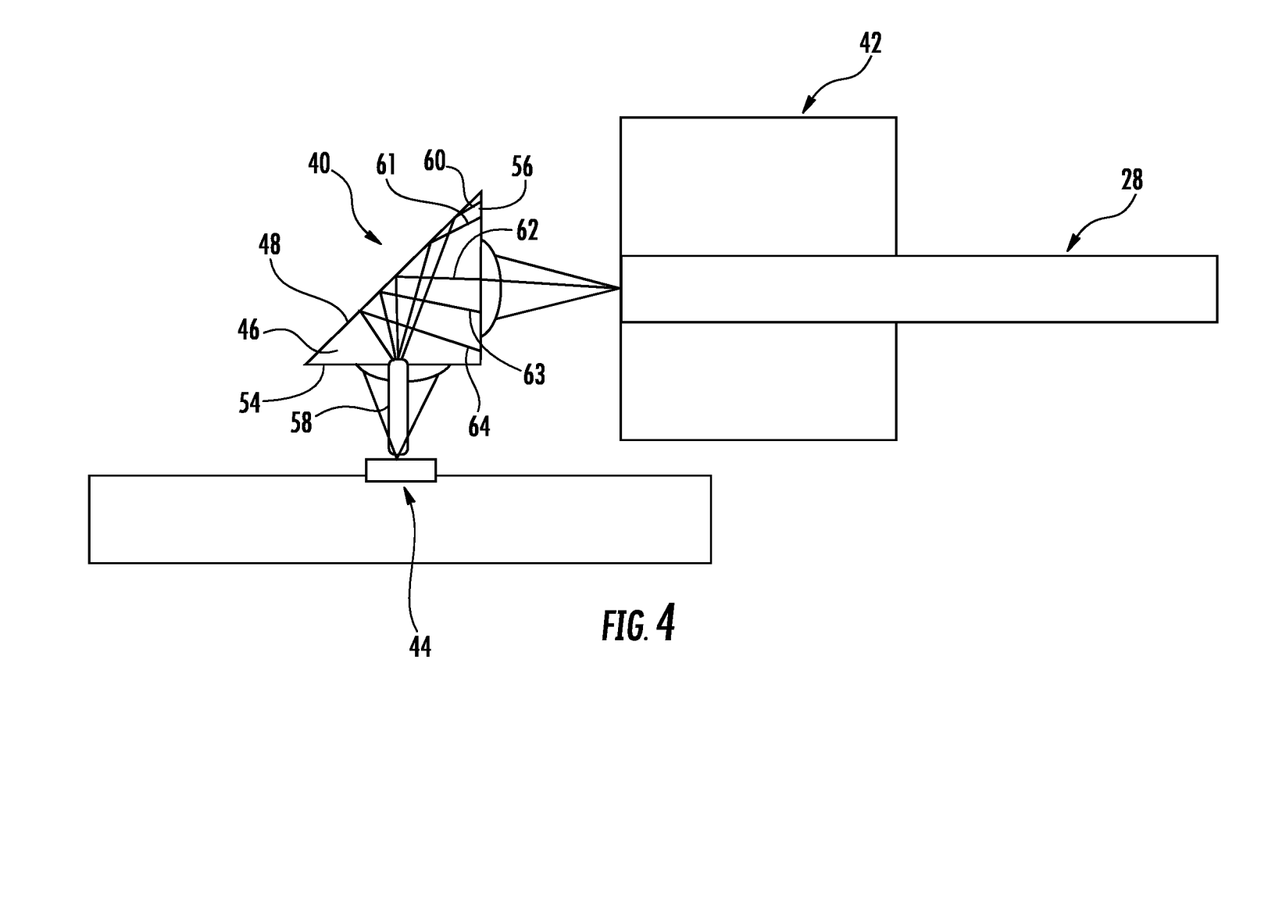
FIG. 4 shows the simplified schematic illustration of FIG. 3 with optical signal paths.

With reference to FIGS. 3-4, a simplified schematic illustration of an embodiment of the optical lantern assembly 40 is shown optically coupled to a transducer 44 and cable 28 having an MPO connector 42. In some embodiments, the optical lantern assembly 40 includes a prism 46 for dispersing and separating the different modes of the optical signal. The optical lantern assembly 40 may further include a mirror 48 to redirect the optical signal as it passes through the prism 46. The mirror 48 may be a surface of the prism 46 or may be a separate reflective surface applied to a surface of the prism. In some embodiments, the optical lantern assembly 40 may include one or more lenses 50, 52 for refracting the optical signals into alignment with the cable 28. In some embodiments, the lenses 50, 52 may refract the light to redirect or focus the optical signal onto a predetermined position of the cable. The lenses 50, 52 may be positioned on surfaces 54, 56 of the prism 46 through which the optical signal passes. For example, in the embodiment shown in FIG. 3, a first lens 50 is positioned on a first surface 54 of the prism 46, and a second lens 52 is positioned on a second surface 56 of the prism. In an embodiment in which the transducer 44 is transmitting (e.g., where the transducer is a VCSEL), the optical signal may travel from the transducer to the first lens 50, passes through the first surface 54, reflects on the mirror 48, passes through the second surface 56, and through the second lens 52 to the optical cable 28. In some embodiments, no lenses may be needed, or one of the first 50 and second 52 lenses may be used alone.

FIG. 4 demonstrates the path of a sample optical signal 58, comprising modes 60, 61, 62, 63, and 64, through the prism 46 of the optical lantern 40. The prism 46 disperses the optical signal 58 by bending portions of the optical signal at different angles according to their respective wavelengths. While the optical signal 58 may enter the first surface 54 as a single signal, the modes 60, 61, 62, 63, 64 separate from one another within the prism 46 based upon their distinct wavelengths and exit the prism at the second surface 56 spatially separated from each other.

The embodiment of FIG. 4 depicts a transmit-side optical lantern 40, which receives optical signals 58 from the VCSEL 44 and spatially filters the optical signals before transmission to the optical cable 28. Likewise, in some embodiments, the optical lantern 40 may be positioned at the receive end of the active optical cable, such that the optical signal enters the second surface 56 and is spatially filtered before being transmitted to the photodiode or photodetector (at the position of VCSEL 44). In some embodiments, optical lanterns 46 may be positioned at both the transmit and receive sides of the optical cable. In some embodiments, the optical lantern may be positioned at the transmit side only.

In some embodiments, the optical lantern 46 may be a glass prism. The optical lantern 46 may include a mode selection mechanism for mode separation. In some embodiments, the optical lantern 46 may include physical waveguides within the optical lantern to direct the different modes to different exit locations on the prism's surfaces. The physical waveguides may define a path of different material or optical properties than the remaining lantern, which channel and direct the modes down predetermined paths. In some embodiments, the modes may be directed to the physical waveguides by arranging entry of the optical signal into the lantern such that each mode uses a different propagation vector, which vectors align with the respective waveguides. For example, in some embodiments, the prismatic effect of the lantern may refract the modes of the optical signal along the different respective propagation vectors, and the waveguides may be formed into the lantern to receive the separated modes. In some embodiments, the angle and/or launching conditions of the optical signal may spatially align the modes with the respective waveguides, either alone or in combination with the prismatic effect.

In some other embodiments, the mode selection mechanism may include the prismatic effect of the lantern itself. In yet some other embodiments, any other space division multiplexing technique may be used to spatially separate the modes of the optical signal.

Using the spatial separation of the output modes 60, 61, 62, 63, 64 of the optical signal 58 at the second surface 56, the cable 28 may be aligned with only a portion of the optical signal that carries the wavelength of interest, while spatially excluding undesired wavelengths. In such embodiments, each mode, corresponding to a different respective wavelength, is incident on a different position of the output surface (e.g., the second surface 56 of the prism 46 in embodiments in which the transducer 44 is transmitting). The undesired wavelengths may be excluded by not aligning the cable 28 with the position of the corresponding mode 60, 61, 62, 63, 64 on the output surface of the prism. In some embodiments, a plurality of cables 28 may be used and each may be aligned with a different subset of modes (e.g., one, two, three, four, five, or greater as discussed herein).

In some embodiments, the modes 60, 61, 62, 63, 64 are spaced along the surface 56 of the prism 46 at a predetermined distance. For example, the modes 60, 61, 62, 63, 64 may be spaced at approximately 5 μm in the Lantern. In some embodiments, the modes 60, 61, 62, 63, 64 may be spaced along the surface 56 of the prism 46 at approximately 5 μm or greater. In some embodiments, the difference between the modes may be 0.5 nm at the VCSEL and a few microns (e.g., approximately 5 μm) at the first surface 54 of the lantern 46 and approximately 125 μm or greater at the second surface 56 of the lantern. The exit spacing at the second surface 56 may equal the spacing of fibers in a multi-fiber arrangement. As used herein, the terms "approximately" or "substantially" indicate that the accompanying dimension need not be achieved with mathematical precision, but rather, that the specified dimension is accomplished to a standard margin of error within manufacturing tolerances and physical limits as would be appreciated by a person of ordinary skill in the art. In some embodiments the optical signal 58 may include up to 6 modes having approximately 0.2 to 1.6 nm wavelength spacing around 850 nm (e.g., evenly distributed around 850 nm, such as with three modes below and three above 850 nm). For example, in some embodiments the optical signal 58 may include 6 modes having 0.5 nm wavelength spacing around 850 nm (e.g., 848.75 nm, 849.25 nm, 849.75 nm, 850.25 nm, 850.75 nm, and 851.25 nm). In some other embodiments, the modes of the optical signal 58 may be spaced at 0.2 nm, 0.3 nm, 0.4 nm, 0.5 nm, 0.6 nm, 0.7 nm, 0.8 nm, 0.9 nm, 1 nm, 1.1 nm, 1.2 nm, 1.3 nm, 1.4 nm, 1.5 nm, or 1.6 nm wavelength difference.

In some embodiments, the cable 28 may align with fewer than all of the modes of the optical signal 58 to reduce interference and increase the transmission range of the AOC. For example, with reference to FIG. 4, the cable 28 is shown aligned with a mode 62 of the optical signal 58. In some embodiments, the cable 28 only aligns with a single mode. In some embodiments, the cable 28 aligns with 3, 4, or 5 modes of the optical signal 58. In some embodiments, the cable 28 aligns with 2 modes of the optical signal 58. In some embodiments, the cable 28 aligns with greater than 5 modes of the optical signal 58. As discussed herein, in some embodiments, a plurality of cables 28 may be used and each may be aligned with a different subset of modes (e.g., one, two, three, four, five, or greater as discussed herein). In some embodiments, up to 6 modes around 850 nm may be used.

The number and position of the modes that align with the cable may be selected by orienting the lens(es), the cable, or both to direct the preferred mode(s) along the optical cable(s). In some embodiments, the one or more lenses 50, 52 may be designed to refract the optical signal 58 such that the desired mode(s) are output in alignment with the optical cable(s) 28. In some embodiments, the position of the optical cable(s) may be adjusted (e.g., by reorienting the position of the socket 43, connector 42, and/or cable fibers 28) to align with the position of the desired modes. In some embodiments, a combination of the lens(es) and cable(s) positioning may be used.

The optical lantern assembly may be designed according to the results from near field to far field of the assembly to align the desired mode with the optical signal. The desired mode(s) may be selected prior to fabrication by testing the output of the transducer 44 and optical lantern 46 and selecting the mode or modes with the highest bandwidth. In such embodiments, the lantern 40 (e.g., via lenses 50, 52) and/or cable 28 may be used to direct the high-bandwidth mode(s) into alignment with the cable, and the transceiver assembly may be constructed with the desired alignment.

Figure 5:
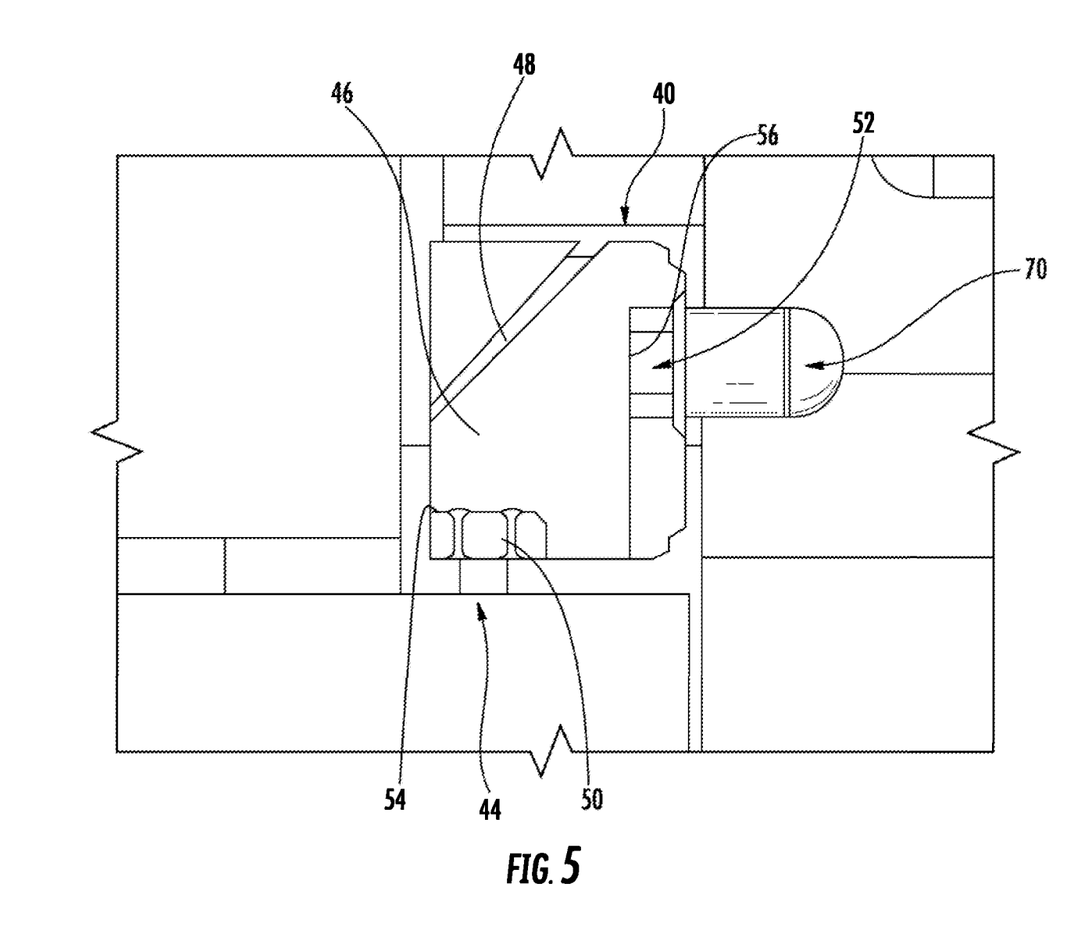
FIG. 5 shows a cross-sectional view of an optical lantern assembly according to some embodiments discussed herein.

With reference to FIG. 5, a cross-sectional view of an optical lantern 40 is shown. The optical lantern assembly 40 includes an alignment pin 70, which aligns and connects with the cable connector 42 (shown in FIGS. 3-4). The prism 46 may disperse and route the optical signal 58 (shown in FIG. 4) in the manner described in the embodiments above. Where the transducer 44 transmits the optical signal, the optical signal may pass through the first lens 50, which may be formed on the first surface 54 of the prism, and into the first surface. The optical signal may then disperse within the prism 46 into a plurality of modes. The dispersing optical signal may reflect off the mirror 48, which is formed on a third surface of the prism 46, towards the second surface 56, and the modes of the dispersed optical signal may pass through the second surface and through the second lens 52, which is formed on the second surface. In some embodiments, the optical signal 58 (shown in FIG. 4) may pass through the first surface 54 normal to the first surface, and in some embodiments, at least one mode of the optical signal may pass through the second surface 56 normal to the second surface.

Each of the first surface 54, second surface 56, and third surface (on which the mirror 48 is disposed) may be in optical communication with each other. In such embodiments, the optical signal may pass from the first surface 54 to the second surface 56, reflecting off the mirror 48 at the third surface, without leaving the prism 46. In some embodiments the mirror 48 may be oriented at 45 degrees to each of the first 54 and second 56 surfaces, with the first and second surface being perpendicular to one another. In some embodiments, the mirror 48 may reflect the optical signal from a first direction extending between the first surface and the mirror to a second direction extending between the mirror and the second surface, and in some embodiments, an optical signal that passes in a first direction that is normal to the first surface may be reflected in a second direction that is normal to the second surface.

Figure 6:
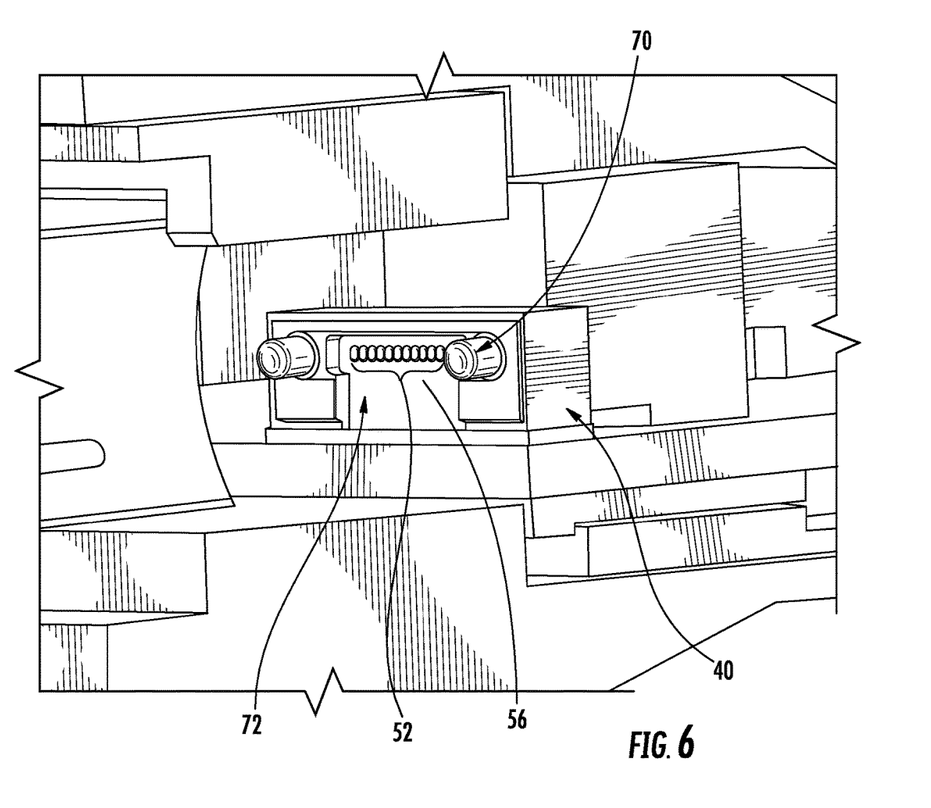
FIG. 6 shows a perspective view of the optical lantern assembly according to FIG. 5.

With reference to FIG. 6, a perspective view of the optical lantern assembly 40 is shown. The depicted optical lantern assembly 40 includes a pair of alignment pins 70 for engaging the connector 42 of the optical cable 28 (both shown in FIG. 3). The depicted lantern assembly 40 includes a recess 72 for receiving the tip of the connector 42 and cable 28, and the assembly includes a plurality of second lenses 52 disposed on the second surface 56. Multiple lenses may be used to align with multiple sets of fibers, for example, in a ribbon configuration. Similarly, a plurality of first lenses and transducers may be used in such a configuration. In such embodiments, a single lantern may be used for each of the plurality of optical paths (e.g., the paths from a given transducer to a given cable) or multiple lanterns may be used for each optical path. In the embodiment shown in FIG. 6, the optical paths, including the transducers, first lenses, second lenses, and/or optical cables may be arranged linearly as shown in FIG. 6.

Many modifications and other embodiments of the inventions set forth herein will come to mind to one skilled in the art to which these inventions pertain having the benefit of the teachings presented in the foregoing descriptions and the associated drawings. Although the figures only show certain components of the apparatus and systems described herein, it is understood that various other components (e.g., components that would normally be mounted on the PCB assembly of a transceiver) may also be part of the transceiver assembly. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A optical assembly comprising:
   an optical cable; and
   an optical transceiver module comprising:
   a socket configured to receive the optical cable;
   an electro-optical transducer configured to generate an optical signal;
   an optical lantern comprising:
   an optical prism defining a first surface and a second surface, wherein the optical prism is configured to receive the optical signal via the first surface, disperse the optical signal into a plurality of modes of the optical signal, and output the plurality of modes via the second surface; and
   a mirror configured to reflect the optical signal from a first direction extending between the first surface and the mirror to a second direction extending between the mirror and the second surface;
   wherein the optical lantern is configured to direct at least one of the plurality of modes of the optical signal into the optical cable, and
   wherein the optical cable is configured to align with fewer than all of the plurality of modes of the optical signal.

2. The optical assembly of claim 1, further comprising:
   a first lens defined on the first surface of the optical lantern, wherein the first lens is configured to refract the optical signal between the electro-optical transducer and the first surface.

3. The optical assembly of claim 1, further comprising:
   a second lens defined on the second surface of the optical lantern, wherein the second lens is configured to refract the at least one of the plurality of modes of the optical signal between the second surface and the optical cable.

4. The optical assembly of claim 1, wherein the first direction is substantially perpendicular to the second direction.

5. The optical assembly of claim 1, wherein the mirror is defined on a third surface of the optical lantern, and wherein each of the first surface, the second surface, and the third surface is in optical communication with each of the other of the first surface, the second surface, and the third surface within the optical lantern.

6. The optical assembly of claim 5, wherein the first direction is substantially perpendicular to the second direction, and wherein the third surface is oriented at approximately 45 degrees with respect to both the first surface and the second surface.

7. The optical assembly of claim 1, wherein the optical cable is configured to align with three, four, or five modes of the optical signal.

8. The optical assembly of claim 1, wherein the optical cable is configured to align with one mode of the optical signal.

9. The optical assembly of claim 1, wherein the optical lantern is configured to output each of the plurality of modes at a different position on the second surface.

10. The optical assembly of claim 9, wherein the optical lantern is configured to separate each of the plurality of modes by at least 5 µm.

11. The optical assembly of claim 9, wherein the optical cable is configured to be positioned adjacent the different position of the at least one of the plurality of modes.

12. The optical assembly of claim 1, wherein the optical cable is a multi-mode optical fiber cable.

13. The optical assembly of claim 1, wherein the electro-optical transducer is a vertical-cavity surface-emitting laser (VCSEL).

14. The optical assembly of claim 1, wherein the optical cable is configured to align with only three, four, or five modes of the optical signal.

15. The optical assembly of claim 1, wherein the optical cable is configured to align with only one mode of the optical signal.

16. The optical assembly of claim 1, wherein the fewer than all of the plurality of modes of the optical signal comprise the highest bandwidth modes of the plurality of modes of the optical signal.

17. The optical assembly of claim 1, wherein the optical prism comprises at least one waveguide configured to receive the at least one of the plurality of modes of the optical signal.

18. The optical assembly of claim 17, wherein each waveguide defines a path of different material or optical properties than a remaining portion of the prism.

19. The optical assembly of claim 1, wherein each mode of the plurality of modes defines a different wavelength.

20. The optical assembly of claim 19, wherein the different wavelengths of the plurality of modes are separated from adjacent modes by 0.2 nm to 1.6 nm.

* * * * *